United States Patent
Pang et al.

(10) Patent No.: US 11,424,890 B2
(45) Date of Patent: Aug. 23, 2022

(54) METHOD AND SYSTEM OF WIRELESS TDMA COMMUNICATION FOR INDUSTRIAL MACHINE-TO-MACHINE COMMUNICATION

(71) Applicant: Hitachi Energy Switzerland AG, Baden (CH)

(72) Inventors: Zhibo Pang, Västerås (SE); Michele Luvisotto, Västerås (SE); Roger Jansson, Västerås (SE)

(73) Assignee: HITACHI ENERGY SWITZERLAND AG, Baden (CH)

( * ) Notice: Subject to any disclaimer, the term of this patent is extended or adjusted under 35 U.S.C. 154(b) by 181 days.

(21) Appl. No.: 16/818,186

(22) Filed: Mar. 13, 2020

(65) Prior Publication Data

US 2020/0295901 A1 Sep. 17, 2020

(30) Foreign Application Priority Data

Mar. 14, 2019 (EP) ..................... 19162695

(51) Int. Cl.
*H04L 5/00* (2006.01)
*H04W 4/70* (2018.01)
*H04J 3/06* (2006.01)
*H04L 5/14* (2006.01)
*H04W 56/00* (2009.01)
(Continued)

(52) U.S. Cl.
CPC .......... *H04L 5/0053* (2013.01); *H04J 3/0682* (2013.01); *H04L 5/0007* (2013.01); *H04L 5/1469* (2013.01); *H04W 4/70* (2018.02); *H04W 56/0045* (2013.01); *H04W 72/042* (2013.01);
(Continued)

(58) Field of Classification Search
CPC ... H04L 5/0053; H04L 5/0007; H04L 5/1469; H04L 7/0008; H04J 3/0682; H04J 3/0667; H04W 4/70; H04W 56/0045; H04W 72/0413; H04W 72/042; H04W 72/0446;
(Continued)

(56) References Cited

U.S. PATENT DOCUMENTS 5,710,765 A 1/1998 Lee et al.
6,470,057 B1 10/2002 Hui et al.
(Continued)

OTHER PUBLICATIONS

M. Bahr, et al., "Proposal for Factory Automation", IEEE P802.15-08/0572r0 Working Group for Wireless Personal Area Networks (WPANs), Dec. 2018, 19 pages.

*Primary Examiner* — Kiet Tang
(74) *Attorney, Agent, or Firm* — Slater Matsil, LLP

(57) ABSTRACT

A communication method for wireless communication uses a TDMA (Time Division Multiple Access) super-frame structure for scheduling uplink and downlink transmissions between a first node and a second node, the second node receives receiving a downlink transmission from the first node and transmits an uplink response to the first node. The transmission of the uplink response is performed in an uplink frame of the super-frame structure. The uplink frame includes a field for uplink payload data and a field for time indicating data. The transmission of the uplink response includes transmitting time stamps in the time indicating data field, the time stamps indicating a time instance of the receiving of the downlink transmission, and the time instance of the transmitting of the uplink response. The time instances are determined using the clock of the second node.

24 Claims, 6 Drawing Sheets

(51) Int. Cl.
 *H04W 72/04* (2009.01)
 *H04W 72/12* (2009.01)

(52) U.S. Cl.
 CPC ... *H04W 72/0413* (2013.01); *H04W 72/0446* (2013.01); *H04W 72/1205* (2013.01)

(58) Field of Classification Search
 CPC ......... H04W 72/1205; H04W 56/0015; H04W 56/005; H04W 56/009; H04W 56/001
 See application file for complete search history.

(56) References Cited

U.S. PATENT DOCUMENTS

| | | | |
|---|---|---|---|
| 2005/0195786 A1* | 9/2005 | Shpak | H04W 52/08 370/338 |
| 2008/0075120 A1* | 3/2008 | Fourcand | H04J 3/0602 370/503 |
| 2009/0245227 A1* | 10/2009 | Chin | H04W 56/007 370/350 |
| 2011/0164556 A1 | 7/2011 | Duan et al. | |
| 2011/0211461 A1 | 9/2011 | Bahr et al. | |
| 2013/0148575 A1 | 6/2013 | Wentink et al. | |
| 2014/0146811 A1* | 5/2014 | Wen | H04J 3/0667 370/350 |
| 2014/0301375 A1 | 10/2014 | Nusairat et al. | |
| 2016/0157285 A1* | 6/2016 | Tabata | H04W 56/001 370/350 |

* cited by examiner

METHOD AND SYSTEM OF WIRELESS TDMA COMMUNICATION FOR INDUSTRIAL MACHINE-TO-MACHINE COMMUNICATION

CROSS-REFERENCE TO RELATED APPLICATIONS

This application claims the benefit of European Patent Application No. 19162695.1, filed on Mar. 14, 2019, which application is hereby incorporated herein by reference.

TECHNICAL FIELD

Embodiments relate to a method and system of wireless TDMA communication for industrial machine-to-machine communication.

BACKGROUND

An example of industrial communication related to the present invention is communications for the monitoring and control of electric power grids, wherein wired communications, compliant with IEC 61850, may be used that provide time slots of some micro-seconds or lower. In, for example, electric substation automation for the control and monitoring of electric power distribution, the requirements for reliability and low latency are comparably high.

However, using wired communications has drawbacks in cost. Wireless alternatives could be cheaper, e.g., in installation, and are sought after for in industrial automation. When using a TDMA scheduled wireless communication, it is important that the equipment is synchronized in order to avoid communication collisions. Also, wireless communication risks being subjected to disturbances and reliably acknowledging correct reception of data can also be considered of high importance in industrial automation and similar systems.

US2011/0211461 ("the 461 publication") describes a wireless communication network aiming at keeping latency low at the same time as effectively handling synchronization and acknowledgement. The 461 publication discusses networks where sensor nodes transfer data to a central base station. The 461 publication describes a frame structure for the wireless communication, wherein synchronization messages are included in a downlink beacon frame. Especially, the 461 publication is related to retransmissions of lost data.

The 461 publication refers to Bahr M. et al Proposal for Factory automation, September 2008 (the Bahr proposal), which describes using group acknowledgment incorporated in a downlink beacon frame from the base station to the nodes. Thus, a number of acknowledgements are arranged within the beacon frame, see for example § 0005, § 0008-§ 0009, § 0012 of the 461 publication, and the downlink (DL) beacon frame includes a synchronization message and may also include a sequence of acknowledgements to a group of nodes, see for example § 0037, last sentence, and § 0038, in the 461 publication.

Both the 461 publication and the Bahr proposal concern TDMA communication where downlink and uplink data messages are scheduled according to a super-frame structure that is periodically repeated over time. Using group acknowledgements included in a downlink beacon frame is a way to effectively handle acknowledgements of uplink transmissions. Also, including a synchronization message in the downlink beacon contributes to efficient scheduling. However, little information is given in the 461 publication about the uplink transmissions. The 461 publication seems mainly targeting uplink data collection from sensor nodes to a base station or gateway. Few details are given on the synchronization, see for example § 0011 and § 0033-§ 0034 of the 461 publication. The synchronization seemingly consists of the start of a super-frame by means of a downlink transmission, possible the downlink beacon includes an indication of the start of a new super-frame. The 461 publication does not present any specific measures for handling propagation delay.

Thus, there is a need for alternative and/or additional measures for developing the scheduling of communication that especially includes handling the uplink transmissions. Measures suitable for contributing to reliability and avoiding latency would be appropriate.

SUMMARY

The present invention relates to wireless communication. Embodiments relate to especially communication methods and systems for industrial monitoring and control purposes, such as monitoring and controlling an electric power system, monitoring and controlling equipment in an industrial manufacturing facility, and/or for performing other industrial automation control and monitoring purposes. Embodiments further relate to TDMA (Time Division Multiple Access) based wireless communication using a frame structure for scheduling of time slots, and especially to synchronization.

Embodiments of the present invention can provide a method for wireless communication suitable for industrial appliances, such as industrial automation, which wireless communication can contribute further to efficient scheduling of the wireless communication.

For this purpose, a first aspect of the present invention provides a communication method for wireless communication using a TDMA super-frame structure for scheduling uplink and downlink transmissions between a first and a second communication node. The communication method is performed by the communication node, which second node comprises a clock. The communication method includes receiving a downlink transmission and transmitting an uplink response. The transmitting of uplink response is performed in an uplink frame of the super-frame structure, which uplink frame comprises a field configured for uplink payload data. Especially, the uplink frame comprises a field for time indicating data, wherein the transmitting of the uplink response includes transmitting time stamps in the time indicating data field, which time stamps indicates the time instance of the receiving of the downlink transmission, and the time instance of the transmitting of the uplink response, which time instances is determined by means of the clock of the communication node.

Using fields in the uplink frames for such time indicating is an efficient way to transfer communication relevant data to the uplink, or first, node. Also, by letting the time stamps indicate reception of the downlink and transmission of the uplink in accordance with the clock of the node provides information about how well the clock is synchronized and information about the transmission time for the communication.

In an embodiment of the first aspect, the uplink frame comprises a field for acknowledgements and the transmitting of the uplink response includes transmitting an acknowledgement indicating the reception of the downlink transmission.

Including an acknowledgement in a field of the uplink frame contributes further to efficient communication; the acknowledgements contributing to reliability, which when included as a field in the frame has a limited effect on latency. For example, and preferably, each acknowledgement can be indicated by a single bit.

In an embodiment of the first aspect, the received downlink transmission comprises synchronization data and the method further comprises synchronizing the clock based on the synchronization data, wherein the synchronizing is performed between the receiving of the downlink transmission, and the transmitting of the uplink response, and the method includes adjusting the time instances in accordance with the synchronization data.

An alternative or additional embodiment of the first aspect comprises receiving a further downlink transmission, which further downlink transmission comprises synchronization data, wherein the method includes synchronizing the clock based on the synchronization data of the further downlink transmission.

In a second aspect, the present invention provides a method for wireless communication using a TDMA super-frame structure for scheduling uplink and downlink transmissions between a first, or uplink, communication node and a second, or downlink, communication node. The communication method is performed by the first communication node, which first node comprises a clock. The communication method includes transmitting a downlink beacon to at least one second node and receiving an uplink response from the at least one second node of the second communication nodes.

For example, the communication method includes registering the time instance of transmitting the downlink beacon, registering the time instance of receiving the response, and receiving an uplink response that comprises time stamps indicating the time instance of the reception of the downlink beacon in accordance with a clock of the second node, and the time instance of the transmitting the uplink response in accordance with the clock of the second node.

The communication method further includes calculating a clock offset between the first communication node and the second node and calculating the propagation delay between the first communication node and the second node. The calculating of clock offset and calculating of propagation delay is based on the registered time instances of the downlink transmission and uplink response and on the time stamps indicating time of reception of the downlink beacon and indicating the time of transmission of the response. A further downlink beacon is transmitted and includes indicating the calculated clock offset and preferably the calculated propagation delay in a field for synchronization data provided in the downlink beacon.

In a third aspect, the present invention provides a communication node comprising a communication interface for communicating with another communication node, a clock and a register for registering times of reception and transmission and time stamping transmissions. The communication node of the third aspect is configured to perform the communication method of the first aspect.

Preferably the communication node of the third aspect further comprises a synchronizer for adjusting the clock, and is configured to perform the synchronizing of the method of the first aspect.

In a fourth aspect, the present invention provides a communication node comprising a communication interface for wireless communication with other communication nodes, a clock for indicating time, a time register for registering times of receiving and transmitting, a time offset calculator for calculating a time offset of a clock and a propagation delay calculator for calculating a propagation delay between communication nodes, which communication node is configured to perform the communication method of the second aspect.

In an embodiment of the fourth aspect, the communication node further comprises an acknowledgment circuit for acknowledging received transmissions, wherein the communication node is configured to include acknowledgements of received uplink frames in a field in the downlink beacons transmitted.

According to a fifth aspect, the present invention provides a communication method for wireless communication, which communication method uses TDMA (Time Division Multiple Access) for communication between a first node and a plurality of second nodes. The TDMA communication uses a super-frame structure for scheduling uplink data transmissions from the second nodes to the first node and scheduling downlink data transmissions from the first node to the second nodes. The communication method comprises transferring a downlink beacon from the first node to the second nodes, and transferring an uplink transmission as a response to the downlink transmission from one second node, of the second nodes, to the first node.

The downlink beacon preferably consisting of a first frame in accordance with the super-frame structure, and the uplink transmission preferably comprising a second frame in accordance with the super-frame structure.

Especially, the communication method, of the fifth aspect, comprises calculating a clock offset and a propagation delay between the first node and the second node using the time instance of transmitting the downlink beacon by the first node, the time instance of receiving the downlink beacon by the second node, the time instance of transmitting the response by the second node and the time instance of receiving the response in the first node, and synchronizing the first node and the second node, which synchronization includes transferring a subsequent downlink beacon to the second node including an indication of the clock offset and the propagation delay in a synchronization field of the downlink beacon.

In an embodiment of the fifth aspect, the present invention further includes registering the time instance of transfer of the first frame by the first node as the time instance of transmitting and by the second node as the time of reception, and registering the time of transfer of the response frame, as the time of transmitting by the second node and the time of receiving by the second node, wherein the calculating of offset and delay being based on the registered time instances.

In an embodiment of the fifth aspect, the communication method further comprises including, in the response, a first and a second time stamp in a time indicating field of the second frame, which first time stamp indicates the time of reception of the first beacon, and which second time stamp indicates the time of transmission of the response.

In an embodiment of the fifth aspect, the communication method further comprises including, in the response, an acknowledgement of the reception of the downlink beacon in an acknowledgement field of the second frame.

According to a sixth aspect, the present invention provides a communication system for wireless communication using TDMA (Time Division Multiple Access) between a first node and a plurality of second nodes. The communication system comprises a super-frame structure for scheduling uplink data transmissions from the second nodes to the first node and scheduling downlink data transmissions from the first node to the second nodes. The super-frame structure comprises a first frame configured for a downlink beacon and a set of second frames, each second frame dedicated for uplink transmissions from a respective one of the plurality of second nodes to the first node. Especially, each second frame comprises a field configured for transmitting time indicating data to the first node, or a fraction of the second frames comprises a field configured for transmitting time indicating data to the first node.

In an embodiment of the sixth aspect, the time indicating data comprises a first and a second time stamp, where the first time stamp indicates reception of a downlink frame, e.g. the beacon, from the first node and the second time stamp indicates transmission of an uplink frame, e.g., the respective second frame of each second node, to the first node.

Preferably, and for each respective second node, in an embodiment of the sixth aspect, each second frame comprises a field configured for acknowledgement of reception of downlink data from the first node. Thus, the super-frame includes a field for acknowledgement in the uplink second frame for acknowledging the downlink first frame, e.g., the beacon.

In a further embodiment of the embodiment of the sixth aspect where each second frame comprises a field configured for transmitting time indicating data to the first node, the first frame comprises a field configured for transmitting synchronization data to each one of the second nodes.

In a further embodiment of the alternative embodiment of the sixth aspect where a fraction of the second frames comprises a field configured for transmitting time indicating data to the first node, the first frame comprises a field configured for transmitting synchronization data to the corresponding fraction of the second node, so that for each time indicating field received in the fraction of the second frames, the first frame, preferably the beacon, is configured for transmitting synchronization data.

In a further embodiment of these synchronization data embodiments of the sixth aspect, the synchronization data of the synchronization field is configured for indicating a propagation delay of transmissions between the first node and the second node and a clock offset of the clock of the second node compared to the first node.

In an embodiment of the sixth aspect, the first node and each second node comprises a respective clock, and the first node being configured to calculate the clock offset of a second node in accordance with the following equation:

$$\Delta = (T^3_0 - T^2_0 + T^3_1 - T^2_1)/2 \qquad \text{eq. 1}$$

where $\Delta$ is the clock offset of the second node in question;

$T^2_0$ is the time instance when the first node transmits a downlink frame, such as the beacon the time instance being determined by the first node (2);

$T^2_1$ is the time instance when the first node receives the uplink frame from the second node according to the clock of the first node;

$T^3_0$ is the time instance when the second node receives the downlink frame, e.g. the beacon, according to the clock of the second node and as provided to the first node by means of the first time stamp;

$T^3_1$ is the time instance when the second node transmits the uplink frame according to the clock of the second node, and as provided to the first node by means of the second time stamp.

In an embodiment of the sixth aspect the first node is configured to calculate the propagation delay d in accordance with the following equation:

$$d = T^3_0 - T^2_0 - \Delta \qquad \text{eq. 2}$$

where d is the propagation delay between the first node and the second node (3.k) in question, and wherein $$\Delta = (T^3_0 - T^2_0 + T^3_1 - T^2_1)/2.$$

In an embodiment of the sixth aspect, the first frame, for each second node, comprises a field configured for acknowledgement of the reception of a second frame of a previous super-frame, in order to acknowledge the uplink second frame of a previous super-frame.

The communication system, preferably the first node, is configured for determining the propagation delay and the clock offset based on the time indicating data of each second node, especially the time stamps received from the second node. The propagation delay for each second node is transmitted to each respective second node, preferably from the first node, and the second node is configured to use the propagation delay for timing future transmissions.

The super-frame may include a set of third frames, where each third frame is dedicated for downlink data to a respective node of the plurality of nodes.

DETAILED DESCRIPTION OF ILLUSTRATIVE EMBODIMENTS

Figure 1:
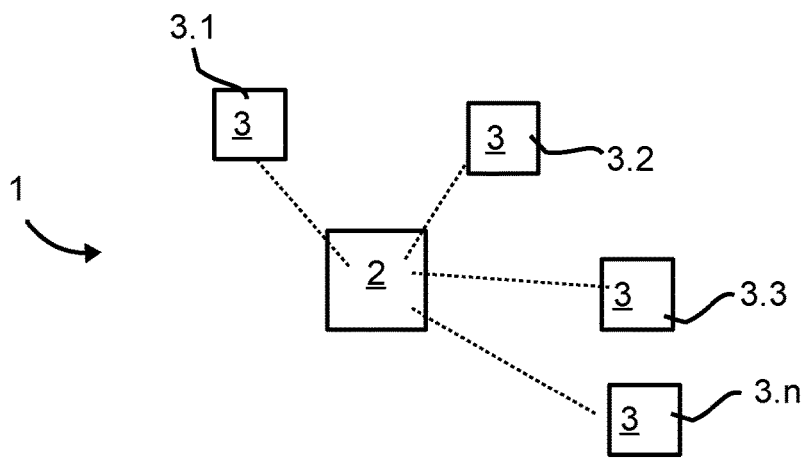
FIG. 1 illustrates a wireless communication network.

FIG. 1 illustrates a wireless communication network 1 having a star configuration where a first node 2 acts as a central control node for number of second nodes 3. Such a first node 2 may also be referred to as a master node, and the second nodes 3 as slave nodes. FIG. 1 illustrates uplink and downlink communication between the first node 2, or master node, and the second nodes 3, or slave nodes. The second nodes 3 are numbered 3.1 to 3.$n$, and are ordered during communication but are essentially similar to each other.

Figure 2A:
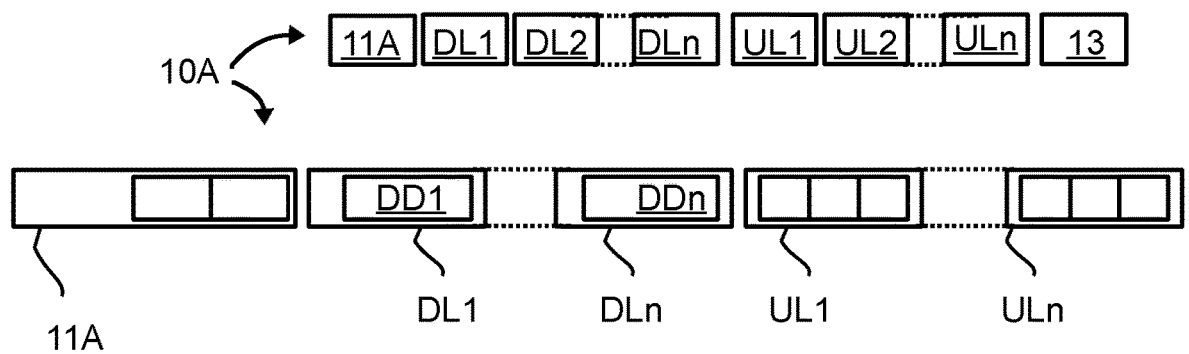
FIG. 2A illustrates an embodiment of a super-frame structure.

FIG. 2A illustrates a super-frame structure 10A employed according to embodiments of the present invention. In the top view in FIG. 2A, the super-frame 10A comprises a first frame in the form of a beacon 11A for downlink transmission to the nodes 3. The super-frame 10A further comprises a number of downlink frames DL1-DLn dedicated for downlink transmissions to respective ones 3.1; 3.2; 3.3; . . . ; 3.$n$ of the nodes 3.1-3.$n$. The dedicated downlink frames DL1-DLn are followed by a set of dedicated uplink frames UL1-ULn configured for transmissions from each respective second node 3.1; 3.2; 3.3; . . . ; 3.$n$ to the first node 2. The super-frame 10A also includes a shared frame 13, preferably for uplink transmissions.

The beacon 11A, the dedicated downlink frames DL1-DLn, and the dedicated uplink frames UL1-ULn are shown in more detail in the lower view of the super-frame 10A in FIG. 2A, where the shared frame 13 is omitted. Especially, the lower super-frame 10A in FIG. 2A illustrates that the beacon 11A and each dedicated uplink frame UL1, . . . , ULn includes specific fields. These fields designate fields used in an embodiment of the present invention and these fields are further illustrated in FIGS. 3A and 4.

Each dedicated downlink frame DL1, DL2, . . . , DLn, in the embodiment of FIG. 2A, comprises a respective field DD1, DD2, . . . , DDn configured for downlink data, which can be referred to as payload data or operational data. Operational data and payload data herein refer to data for monitoring or control of the process, such as the industrial process, being monitored and/or controlled. The operational/payload data being in contrast to acknowledgments and synchronization data used for controlling the communication.

Figure 2B:
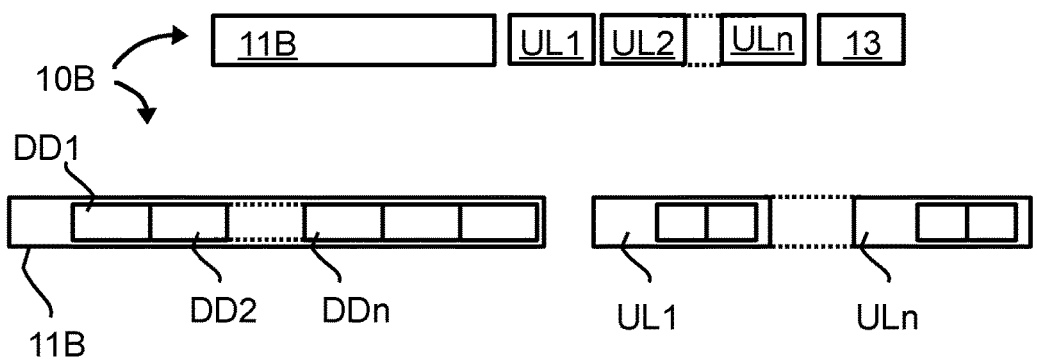
FIG. 2B illustrates an embodiment of a super-frame structure.

FIG. 2B illustrates a super-frame structure 10B employed according to alternative embodiments of the present invention. In the top view in FIG. 2B, the super-frame 10B comprises a first frame in the form of a beacon 11B for downlink transmissions to the nodes 3. The beacon frame 11B is followed by a set of dedicated uplink frames UL1-ULn configured for transmissions from each respective second node 3.1, 3.2, 3.3, . . . , 3.4 to the first node 2. The super-frame 10B also includes a shared frame 13, preferably for uplink transmissions.

The downlink beacon 11B of the embodiment of FIG. 2B comprises a number of downlink fields DD1-DDn, as illustrated in the lower view of FIG. 2B, each downlink field DD1, DD2, . . . , DDn dedicated for downlink payload transmissions to respective ones of the nodes 3.1, 3.2, 3.3, . . . , 3.$n$.

Figure 3A:
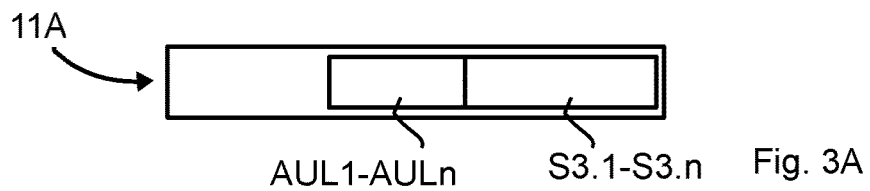
FIG. 3A illustrates an embodiment of the downlink beacon of the super-frame corresponding to the embodiment of FIG. 2A.
Figure 3B:
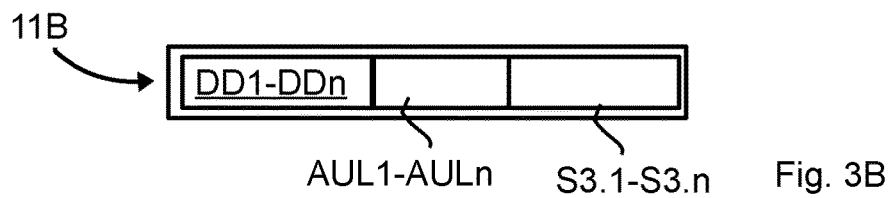
FIG. 3B illustrates an embodiment of the downlink beacon of the super-frame corresponding to the embodiment of FIG. 2B.

FIGS. 3A, 3B illustrate the downlink beacons 11A, 11B, respectively, in greater detail. The downlink beacons 11A, 11B, of both FIGS. 3A, 3B, include a field AUL1-AULn for acknowledgements of previous respective uplink transmissions, i.e. acknowledgement of each uplink frame UL1, UL2, . . . , ULn, and a field S3.1-S3.$n$ for respective synchronization data to individual ones of the second nodes 3.1, 3.2, . . . , 3.$n$.

The field for acknowledgements AUL1-AULn is provided for the first node 2 to acknowledge the reception of data in the uplink frames UL1-ULn, one acknowledgement for each of the second nodes 3.1, 3.2, 3.3, . . . , 3.$n$. Each acknowledgment preferably has the size of one bit and, i.e., the total size of the field AUL1-AULn for acknowledgements is n bits for acknowledging reception from the n second nodes 3.1-3.$n$.

The number of synchronization fields may preferably be as high as the number of second nodes 3.1-3.$n$ to enable accurate synchronization. To provide fast and reliable communication it is important to synchronize often, and in many industrial applications synchronization should be performed as often as every super-frame 10A, 10B and contribute to the control the industrial process with high accuracy.

Figure 3C:
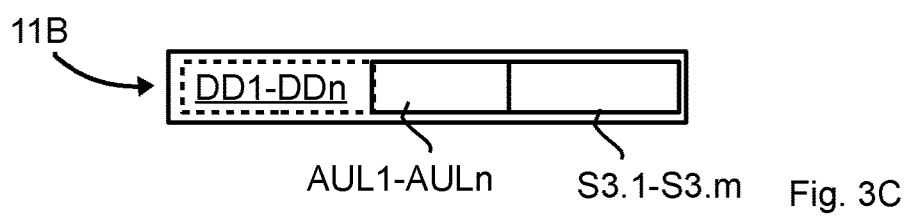
FIG. 3C illustrates further embodiments of the downlink embodiments of FIGS. 3A and 3B.

However, in another embodiment where the applications in question require less strict need for synchronization, the number of synchronization fields configured can be lower than the number of second nodes 3.1-3.$n$. The communication interface can be more efficiently used if the number of synchronization fields are limited, and each second node 3.1, 3.2, 3.3, . . . , 3.$n$ may in some applications not need synchronization for each super-frame 10A, 10B. For example, the number of synchronization fields can be selected as half (n/2) of the number (n) of second nodes 3.1-3.$n$, so that each second node 3.$k$ is synchronized every second super-frame 10A, 10B. FIG. 3C illustrates the embodiment where the number m of synchronization fields S3.1-S3.$m$ are lower than the number n of second nodes 3.1-3.$n$.

The field for synchronization data S3.1-S3.$n$ or S3.1-S3.$m$ comprises data slots for transmitting synchronization data from the first node to each second node 3.1, 3.2, 3.3, . . . , 3.$n$. The synchronization data for each second node 3.1, 3.2, 3.3, . . . , 3.$n$ is determined by the first node on the basis of time indicating data received from the second node 3.1, 3.2, 3.3, . . . , 3.$n$ in question. The determining of the synchronization data for transmission in the synchronization field S3.1-S3.$n$ or S3.1-S3.$m$ will be described further in relation to FIG. 5.

The embodiment of FIG. 3B differs from the embodiment of FIG. 3A in that the beacon 11B comprises downlink payload data fields DD1-DDn, each dedicated for a specific second node 3.$k$. In the embodiment of FIG. 3A the payload data fields DD1-DDn are provided in the dedicated downlink frames DL1-DLn. In the embodiment of FIG. 3C, the payload data fields DD1-DLn are optional, to illustrate that the embodiment of FIG. 3C can be provided in any of the embodiments of FIGS. 3A and 3B.

Figure 4A:
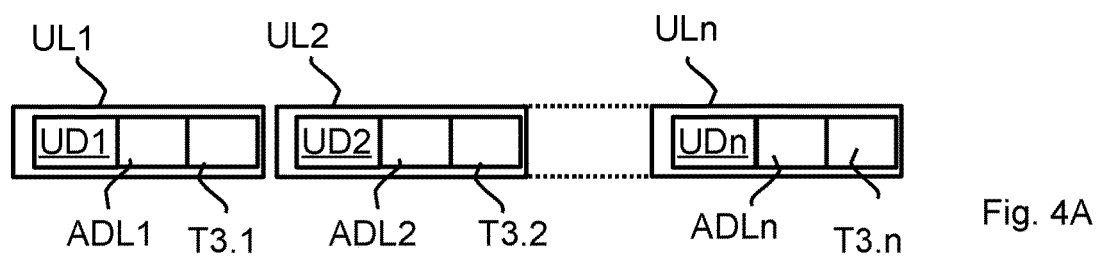
FIG. 4A illustrates a set of uplink frames according to an embodiment of the present invention related to the super-frame structures of the embodiments of FIGS. 2A and 2B.
Figure 4B:
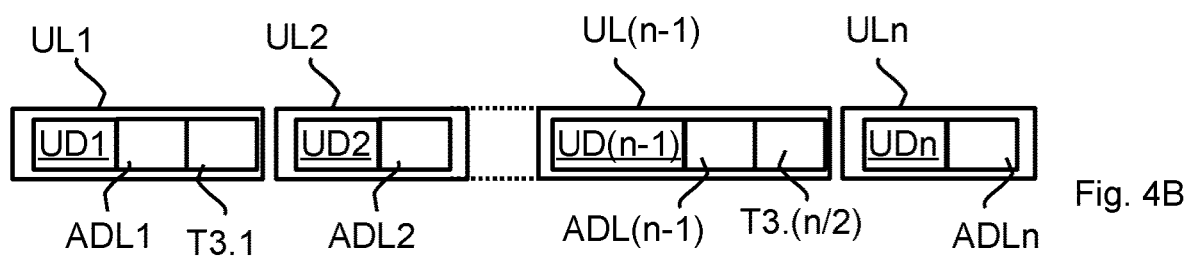
FIG. 4B illustrates an alternative to the embodiment of FIG. 4A.
Figure 4C:
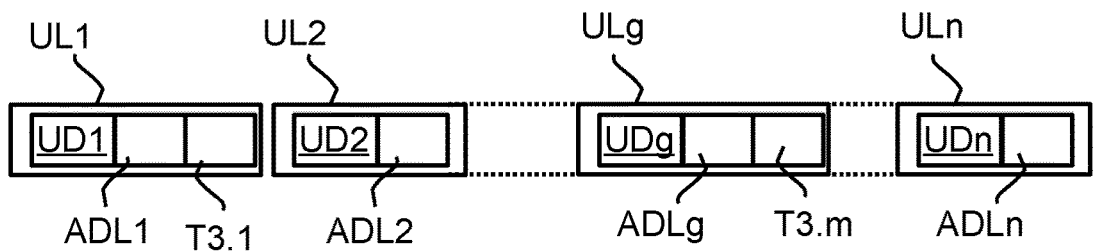
FIG. 4C illustrates an alternative to the embodiment of FIG. 4A, which embodiment comprises uplink frames that correspond to the downlink beacon in the embodiment of FIG. 3C.

FIGS. 4A-4C illustrate how acknowledgements and time indicating data are piggybacked to the uplink payload transmissions.

Each uplink frame UL1, UL2, . . . , ULn of the set of uplink frames UL1-ULn of FIGS. 4A-4C includes a field UD1, UD2, . . . , UDn configured for uplink operational, or payload, data. Each uplink frame UL1, UL2, . . . , ULn of the set of uplink frames UL1-ULn of the embodiment of FIG. 4A includes two specific fields; one field ADL1, ADL2, . . . , ADLn for acknowledgement, and one field T3.1, T3.2, . . . , T3.$n$ for time indicating data. Each uplink frame UL1, UL2, . . . , ULn of the set of uplink frames UL1-ULn of the embodiments of FIGS. 4B-C includes one specific field; one field ADL1, ADL2, . . . , ADLn for acknowledgement. A fraction, such as ½, ⅓, . . . , 1/n, of the uplink frames UL1-ULn in the embodiment of FIG. 4C includes a field T3.1, T3.2, . . . , T3.$m$ for time indicating data. The embodiment of FIG. 4B illustrates m=n/2; i.e. half of the uplink frames UL1-ULn comprises a field T3.1, T3.2, . . . , T3.(n/2) for time indicating data.

In these embodiments of FIGS. 4B-C, the number of time indicating fields T3.1-T3.(n/2) and T3.1-T3.$m$ is limited to less than every uplink frame UL1-ULn, these time indicating fields of the super-frame being configured for applications where synchronization is performed in every super-frame, but not for every second node 3.1-3.n. The number of time indicating fields in these uplink frames correspond to the number of synchronization fields in the downlink frames, see example of FIG. 3C. The embodiment of FIG. 4B illustrate the special embodiment wherein each second node 3.1, 3.2, 3.3, . . . , 3.n is synchronized in every second super-frame 10A, 10B and transmit time indicating data in every second super-frame 10A, 10B.

Each second node 3.1, 3.2, 3.3, . . . , 3.n should be configured to use its acknowledgement field ADL1, ADL2, . . . , ADLn to acknowledge the reception of the beacon 11A, 11B and/or the dedicated downlink frame DL1, DL2, . . . , DLn, including acknowledging reception of the payload data in the dedicated downlink field DD1; DD2; . . . ; DDn. Each second node 3.1, 3.2, 3.3, . . . , 3.n should be configured to use the field for time indicating data T3.1, T3.2, . . . , T3.n, or T3.1, T3.2, . . . , T3.m, to transfer data indicating the time of its reception of downlink data, e.g. downlink beacon 11A, 11B or payload data of respective field DD1; DD2; . . . ; DDn, and the time of its transmission of uplink data UL1; UL2; . . . ; ULn, e.g. the uplink payload data field UD1; UD2; . . . ; UDn. The received time indicating data will be used by the first node 2 to provide synchronization data to each second node 3.1; 3.2; 3.3; . . . ; 3.n. Suitably, each second node 3.1; 3.2; 3.3; . . . ; 3.n is configured to use the time indicating data field T3.1; T3.2; . . . ; T3.n to time stamp reception of the beacon 11A, 11B and the transmission time instant of the uplink frame UL1, UL2, . . . , or ULn. These time stamps should subsequently be used by the first node 2 to provide synchronization data, such as propagation delay and clock offset data, to each second node 3.1, 3.2, 3.3, . . . , 3.n in the synchronization field S3.1-S3.n, or S3.1-S3.n, of a following beacon 11A, 11B. In the embodiment of FIG. 3C, the synchronization data are provided in the synchronization fields S3.1-S3.m to each node 3.1-3.m that is scheduled for synchronization in the present super-frame.

Preferably, each synchronization field S3.1, S3.2, . . . , S3.n (or S3.1, S3.2, . . . , S3.m) from the first node 2 comprises an indication of a respective propagation delay and an indication of a respective time offset of respective ones of the second node 3.1, 3.2, . . . , 3.n, which propagation delay and time offset is derived using the time indicating data received from respective ones of the second node 3.1, 3.2, 3.3, . . . , 3.n.

Figure 5:
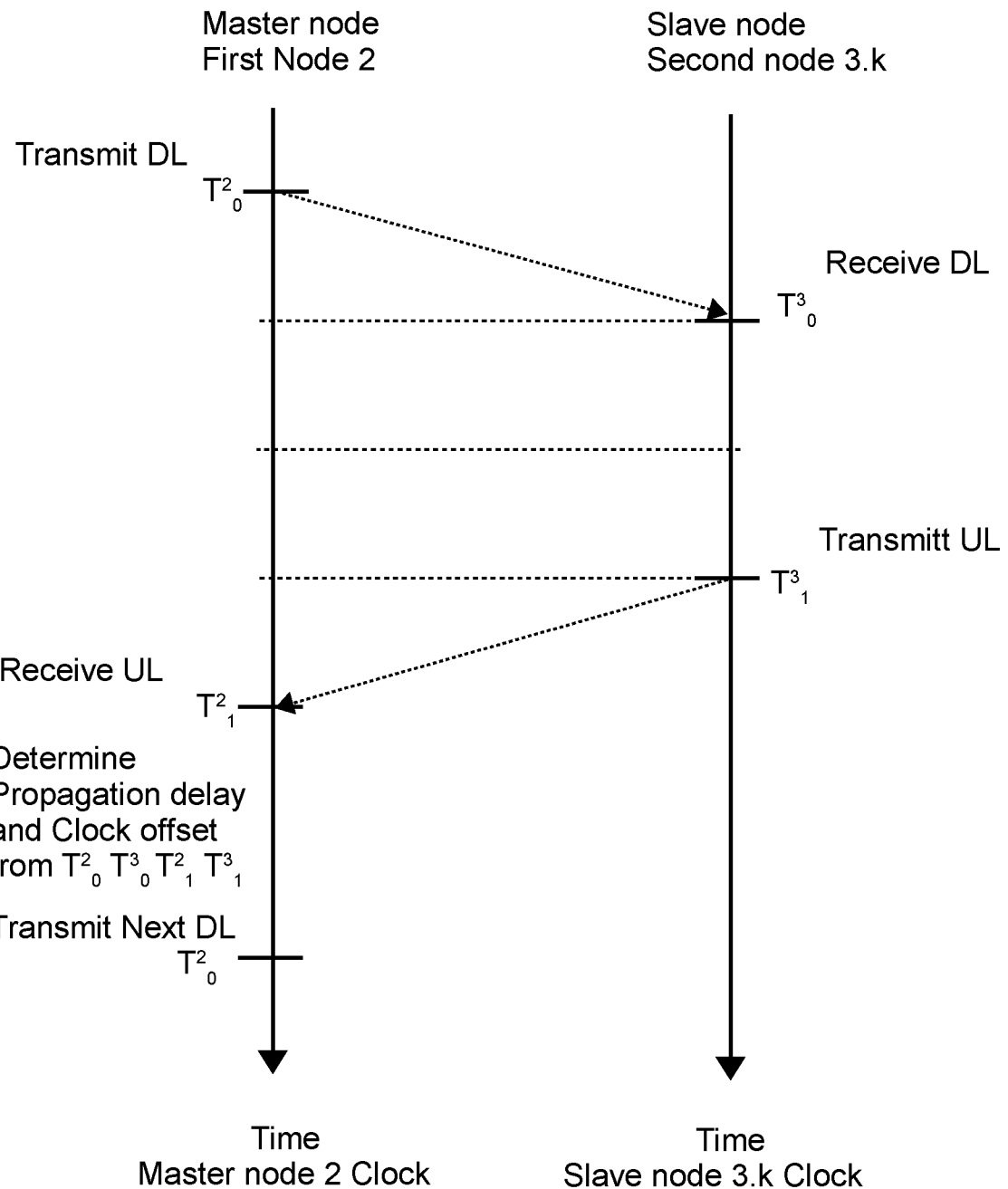
FIG. 5 illustrates transmissions between a first node and a second node.

A preferred embodiment for the calculation of a propagation delay and a time offset is given in equations 1 and 2, and with reference to FIG. 5. In FIG. 5, the master node, or first node 2, transmits a beacon frame 11A, 11B at time instance $T^2_0$ and receives an uplink frame ULk at time instance $T^2_1$. The superscript "2" in $T^2_0$ and $T^2_1$ indicates the time according to a clock of the first node 2. The beacon frame 11A, 11B is received by each second node 3.1; 3.2; . . . ; 3.n, as exemplified by the slave node, or second node 3.k, in FIG. 5. The second node 3.k receives the beacon frame 11A, 11B at time instance $T^3_0$, and transmits an uplink frame ULk as a response at time instance $T^3_1$. The superscript "3" in $T^3_0$ and $T^3_1$ indicates that the time is provided by the second node 3.k. The second node 3.k is configured to time stamp the time instances $T^3_0$ and $T^3_1$ and include them in the uplink frame ULk in the previously described time indicating data field T3.k.

A time offset Δ, for a respective second node 3.1, 3.2, 3.3, . . . , 3.n, can be calculated as follows:

$$\Delta = (T^3_0 - T^2_0 + T^3_1 - T^2_1)/2 \qquad \text{eq. 1}$$

where $T^2_0$ is the time instance when the first node 2 transmits the beacon 11, and where the time instance is determined according to the first node 2;

$T^2_1$ is the time instance when the first node 2 receives the uplink frame ULk from the second node 3.k (where "k" denotes any of 1 to n) according to the time of the first node 2;

$T^3_0$ is the time instance when the second node 3.k receives the beacon 11 according to the time of the second node 3.k;

$T^3_1$ is the time instance when the second node 3.k transmits the uplink frame ULk according to the time of the second node 3.k.

The propagation delay "d" for the respective second node 3.1, 3.2, 3.3, . . . , 3.n, can be calculated as follows:

$$d = T^3_0 - T^2_0 - \Delta \qquad \text{eq. 2}$$

with Δ according to equation 1.

The second node 2 is configured to calculate the time offset Δ and propagation delay d for the second node 3.k and include the time offset Δ and the propagation delay d in the synchronization field S3.1-S3.m of the following beacon 11A, 11B, denoted "Next DL" in FIG. 5.

The two-way synchronization of the present invention provides an absolute time in the communication system, and facilitates synchronized control of an underlying industrial process, such as time-critical industrial automation processes.

Figure 6:
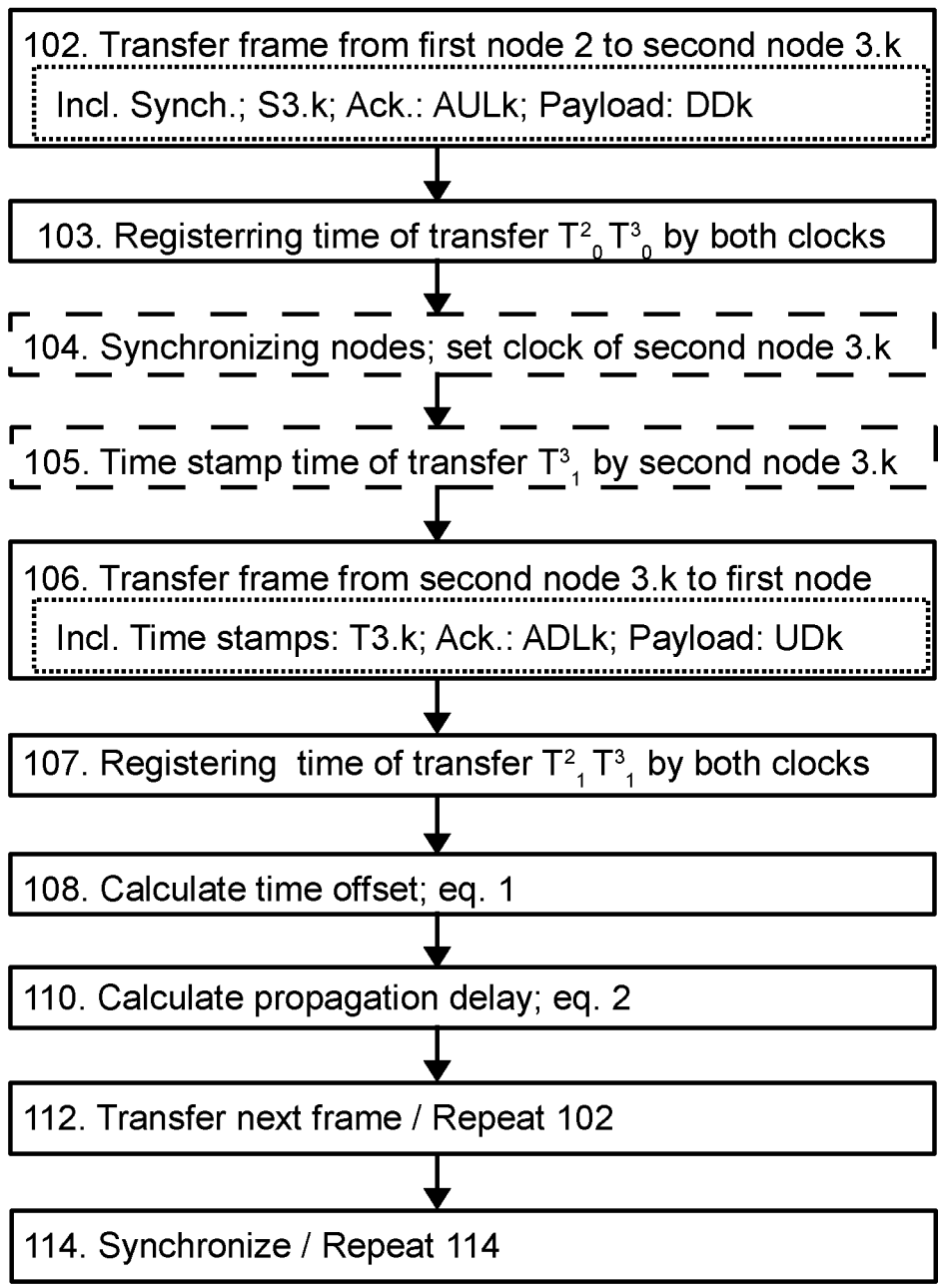
FIG. 6 illustrates a method of communication according to an embodiment of the present invention.
Figure 7:
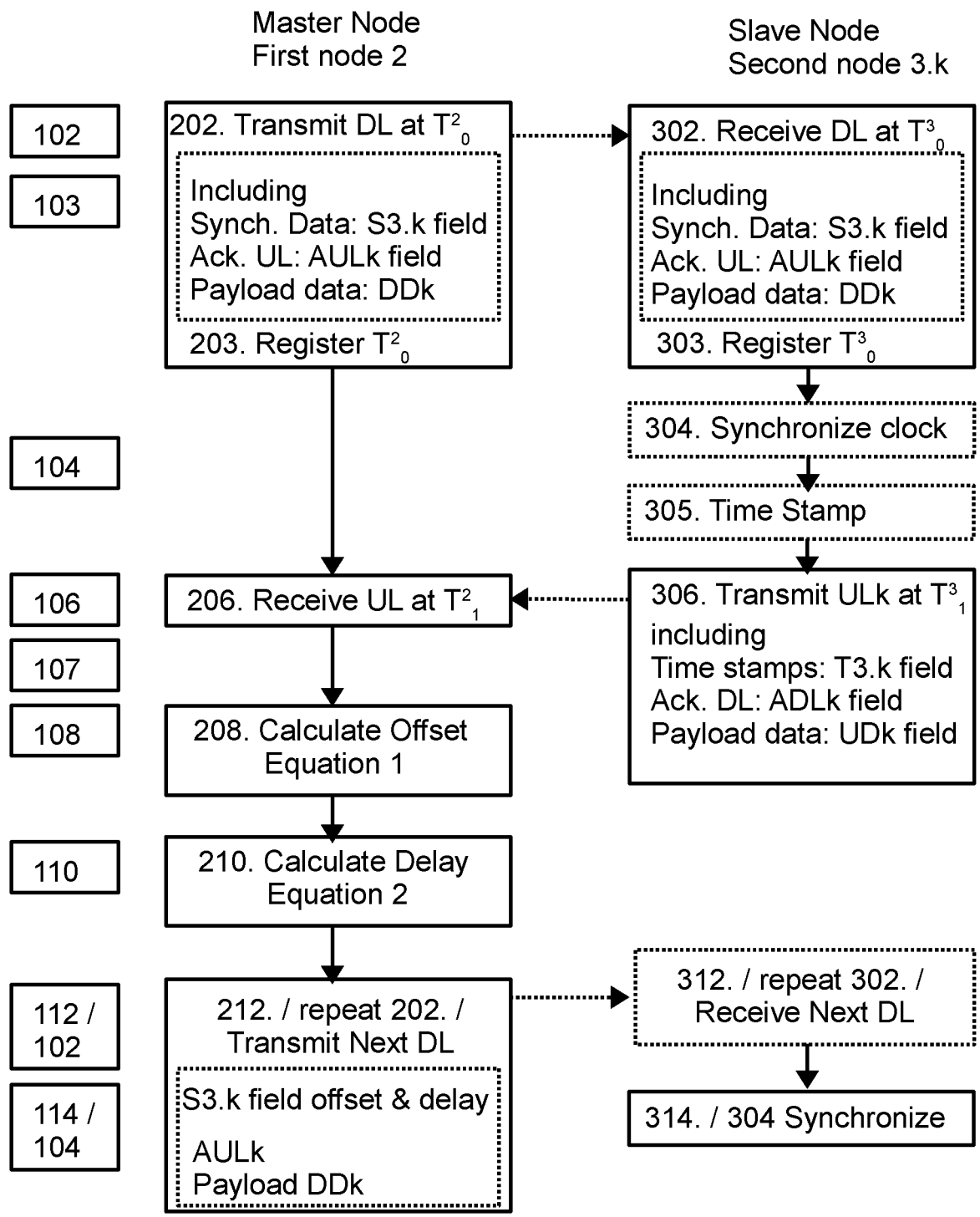
FIG. 7 illustrates an embodiment of methods of communication according to the present invention, as performed by means of a master node and a slave node.

The downlink and uplink transmissions of FIG. 5 are described in further detailed embodiments in FIG. 6 and FIG. 7, including a specific emphasis on synchronization. FIG. 7 illustrates a communication method 100 wherein the communication method 200 to the left in the figure is performed by the first node 2, and the communication method 300 to the right is performed by any of the second nodes 3.1-3.n, i.e. a slave node, or second node 3.k.

The communication method 100 of FIG. 6 includes transferring 102 a downlink transmission, including a first frame (11A, 11B or DLk), preferably a beacon 10A, 10B, from a first node 2 to a second node 3.k. The communication method comprises registering 103 the time instant of transmitting $T^2_0$ and the time instant of receiving $T^3_0$ the first frame, such as the beacon 11A, 11B. The registering 103 of the time instant of transmitting $T^2_0$ the first frame being made according to a "clock" of the first node 2. The registering 103 of the time instant of receiving the first frame 11A, 11B $T^3_0$ being made according to a "clock" of the second node 3.k. The TDMA schedule used in the node 2, 3.k can be seen as such a "clock", and the consequence of the synchronization is that the TDMA schedule of the node, preferably the slave node, being adjusted. The communication method 100 preferably includes registering 105 the time instant $T^3_1$ of a response frame transfer as a time stamp in the response frame ULk, which registering is performed by the second node 3.k.

The first frame, preferably the beacon frame 11A, 11B, includes a synchronization data field S3.k, an acknowledgement field AULk for acknowledging reception of a previous uplink transmission, and a payload data field DDk, as previously described with reference to the super-frame structure 10A, 10B in FIGS. 1 to 3B.

The response comprises transferring 106 a second frame, e.g. the uplink frame ULk, from the second node 3.k to the first node 2. Transferring 106 of the second frame ULk is preferably time stamped and the transfer includes the time stamp of the transfer of the first frame, according to the clock, or time, of the second node 3.$k$, and also includes the time stamp of the transfer of the second frame according to the clock of the second node 3.$k$. The method further includes registering 107 the time $T^2{}_1$ $T^3{}_1$ the second frame ULk is transferred. The registering 107 of the time instant of transferring $T^2{}_1$ $T^3{}_1$ the second frame ULk being made according to the clock of the first node 2 and the time of the second node 3.$k$. The time of transmission $T^3{}_1$ according to the clock of the second node 3.$k$, and the time of reception $T^2{}_1$ according to the clock of the first node 2. Thus, preferably the first node 2 obtains the time instances of both transferred frames 11A, 11B, and ULk as registered by both nodes 2, 3.$k$ in relation to their respective clock; i.e. $T^2{}_0$ $T^3{}_0$ $T^2{}_1$ and $T^3{}_1$. These registered time instances are subsequently used for synchronization of the first 2 and the second node 3.$k$. The clock of the second node 3.$k$, which is a slave node, being adjusted in order to correspond to the time of the clock of the first node 2, which is the master node. Adjusting clock of every second node 3.1; 3.2; . . . ; 3.$n$ provides a absolute time for the communication system; i.e. the first node 2 and all second nodes 3.1-3-$n$ will have the same time. In time-critical operations performed in many industrial applications, an absolute time provided by the machine-to-machine communication enables controlling, e.g. synchronizing, actions taken in the industrial operations controlled.

The transferring 106 of the response to the first frame 11A, 11B, DLk is performed by means of the transfer of the second frame ULk, which comprises an acknowledgement field ADLk for acknowledging reception of the first frame 11A, 11B, DLk, and a payload data field UDk for transfer of operational data to the first node 2, in addition to the time indicating fields T3.$k$ that includes the time stamps.

The communication method 100 further includes calculating 108 a time offset, such as the deviation of the clock, e.g. TDMA schedule, of the second node 3.$k$ compared to the clock, e.g., TDMA schedule, of the first node 2. The calculation 108 of time offset is preferably made in accordance with equation 1.

The communication method 100 further includes calculating 110 the propagation delay between the first node 2 and the second node 3.$k$, and preferably the propagation delay is determined in accordance with equation 2.

The communication method preferably also includes synchronizing the clocks, preferably setting the clock of at least one second node 3.1-3.$n$, which means that the TDMA schedule of the at least one second node 3.1-3.$n$ is adjusted. The synchronization 104 being performed by means of synchronization data added to a synchronization field S3.1-S3.$m$ of the first frame 11A, 11B or DLk. The synchronization data being calculated from a previous transfer. Each clock of the second nodes 3.1-3.$n$ may preferably be adjusted each super-frame 10. In other preferred embodiments, each clock is set for every mth super-frame 10, e.g. every second, every third, every fourth, . . . , or every nth super-frame.

The communication method 100 further includes transfer 112 of a further frame, preferably a following beacon 11A, 11B, from the first node 2 to the second node 3.$k$. This transfer 112 is a repetition of the transfer 102 of the first frame 11A, 11B, DL, includes synchronization data in fields S3.1-S3.$m$ of the previous downlink (e.g. 11A, 11B) and uplink (e.g. ULk) frames, preferably as calculated in accordance with equations 1 and 2.

The communication method 100 continues with synchronization 114 of the two nodes, preferably the clock, or TDMA schedule, of second node 3.$k$ is adjusted 104/114 based on the calculated (108) time offset and the calculated (110) propagation delay.

FIG. 7 illustrate a preferred embodiment, and especially the measures (communication method 200) performed by means of the master node, or first node 2; and the measures (communication method 300) performed by the slave node, or second node 3.$k$. The communications methods 200, 300 correspond to the overall communication method 100, and the correspondence is indicated by the reference numerals of the communication method 100 to the left in FIG. 7. For example, the transferring 102 of the first frame 11A, 11B, DLk corresponds to the transmitting 202 of a first downlink frame, or beacon 11A, 11B from the first node 2 and to the receiving 302 of the first downlink frame, or beacon 11A, 11B, by the second node 3.$k$.

The communication method 200 performed by the first node 2, or master node, comprises transmitting 202 a downlink frame, e.g. the beacon 11A, 11B, at time instance $T^2{}_0$ and registering 203 the time of transmission. The communication method 200 performed by the first node 2 further comprises receiving 206 an uplink response at time $T^2{}_1$. The uplink response ULk includes time stamps indicating reception of the first frame 11A, 11B, DLk, i.e. $T^3{}_0$, and transmission of the response ULk, i.e. $T^3{}_1$. The communication method continues with calculating 208 the time offset and calculating 210 the propagation delay based on the received time stamps and its own registered times of transmission $T^2{}_0$ and reception $T^2{}_1$. The calculated time offset and propagation delay is indicated in the next DL transmission 212. Each downlink transmission 202, 212, illustrated by the downlink transmission 202 and the next downlink transmission 212, preferably includes synchronization data to at least one of the second nodes 3.1; 3.2, . . . , 3.$n$ calculated from the previous downlink and uplink transfers. Each downlink transmission 202, 212 also includes acknowledgement fields AULk for acknowledging the received previous uplink transmission, and a payload data field DDk.

The method 300 performed by the second node 3.$k$ comprises synchronizing 304/314 of its TDMA schedule based on synchronization data received in the downlink transmission 11$a$, 11B, DLk. Thus, the method 300 performed by the second node 3.$k$ comprises receiving 302 a downlink transmission including synchronization data in a field S3.1, S3.2, . . . , S3.$m$, which synchronization data is used by the second node 3.$k$ to synchronize its clock, i.e. adjust its clock in accordance with the time of the first node 2. The received 302 downlink transmission, e.g. beacon 11A, 11B, also includes the described acknowledgements of acknowledgement field AULk and downlink payload data in field DDk.

The method 300 performed by the second node 3.$k$ further comprises an uplink transmission 306 of payload data, in field UDk, that may include time stamps in a time indicating field T3.1-T3.$m$ corresponding to the time $T^3{}_0$ of reception of the downlink transmission and the time $T^3{}_1$ of transmission of the uplink response, and acknowledgement of the received downlink transmission in acknowledging fields ADLk. The uplink transmission 306 should include time stamps for each second node 3.1-3.$n$ that should be synchronized in the following super-frame 10A, 10B and obtain synchronization data when receiving 312 the following downlink transmission, e.g. when receiving 312 the next beacon 11A, 11B.

Figure 8:
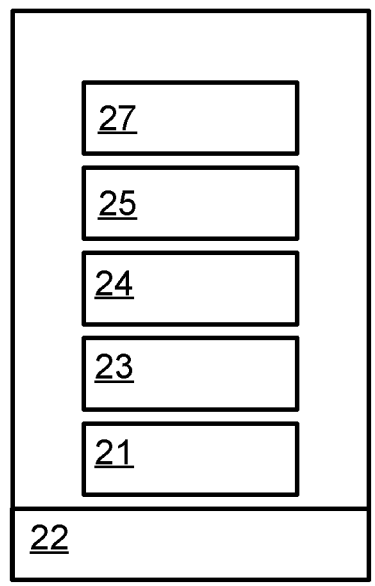
FIG. 8 illustrates an embodiment of a master node, or first node configured for performing part of the method of FIG. 7.
Figure 9:
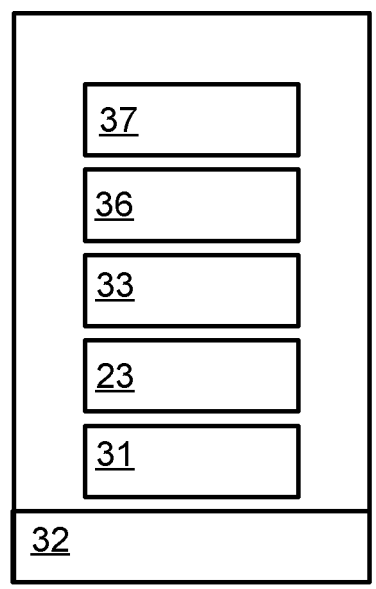
FIG. 9 illustrates an embodiment of a slave node, or second node configured for performing a corresponding part of the method of FIG. 7.

FIGS. 8 and 9 illustrate communication nodes configured to perform the described methods. FIG. 8 disclose a master node, or second node 2. FIG. 9 disclose a slave node, or second node 3.$k$. Each communication node of FIGS. 8-9 are configured to perform its parts of the methods illustrated in FIGS. 5-7. The first node 2 of FIG. 8 comprises a wireless communication interface 22 for communication with the second nodes 3.1-3.$n$. The second node 3.$k$ of FIG. 9 comprises a wireless communication interface 32 for communication with the first node 2. The first node 2 and second node 3.$k$ constitute a combination of hardware and software, and are illustrated as comprising means for performing the above previously disclosed methods. The first node 2 and second node 3.$k$ may also include an interface to an underlying industrial process, for example the first node is communicatively connected to a wired communication system of the industrial process, and the second node 3.$k$ operationally connected, by an interface, to a sensor and/or to industrial process equipment, however such interfaces are not explicitly illustrated.

The first node 2 of FIG. 8 further comprises a clock 21 and a time register unit, or time register 23. The first node 2 comprises the clock 21 and the time register 23 in order to perform the registering of transmission times and reception times, and is thereby configured to perform the registering of times of steps 203, 206 used when performing the calculation of offsets (208) and calculation of propagation delay (210) for each second node in the communication system. The first node also includes calculation means for these calculations, including a time offset calculator 24 and a propagation delay calculator 25. In order to provide efficient and reliable communication, the first node further includes acknowledgement circuitry 27 to acknowledge uplink transmissions and include these acknowledgements, preferably one bit per second unit 3.$k$, in a field of a downlink frame, such as the beacon 11A, 11B.

The second node 3.$k$ of FIG. 9 further comprises a clock 31 provided for time indication, scheduling its communication, and synchronization to the clock 21 of the first node 2, and thereby to the communication system 1. The second node 3.$k$ further comprises a synchronizer 36 for performing the synchronization. The second node 3.$k$ further comprises a register unit, or time register (registering means) 33 in order to register times of reception and transmission, configured for the registering 303, 103, and time stamping 305, 105 performed by the second nodes and illustrated in of FIGS. 6 and 7.

Embodiments of communication methods 100, 200, 300 for wireless TDMA communication using a super-frame structure 10A, 10B between a first 2 and at least one second node 3.$k$ has been provided. In embodiments the second nodes 3.$k$ transmit payload data in uplink frames ULk that comprises a piggybacked field for time indicating data T3.$k$, and preferably a field ADLk for acknowledging a received downlink transmission. The first node 2 is configured for calculating a clock offset and propagation delay based on the received time indicating data. In embodiments, the first node 2 is configured to transmit calculated clock offsets and propagation delay data, and preferably acknowledgements, in piggybacked fields of a downlink payload data frame, such as a beacon 10A, 10B, to the second nodes 3.1-3.$n$. These embodiments aims at providing high reliability and low latency for industrial machine-to-machine communications, where time indicating data, synchronization data, and acknowledgement are efficiently transferred and an efficient two-way synchronization process may provide absolute time useful for time critical control applications. The present invention is, however, not limited to these embodiments, but may be varied by the skilled person within the scope of the claims.

What is claimed is:

1. A communication method for wireless communication using a TDMA (Time Division Multiple Access) super-frame structure for scheduling uplink and downlink transmissions between a first node and a second node that each comprise a clock, wherein the communication method is performed by the second node, the method comprising:
  receiving a downlink transmission from the first node; and
  transmitting an uplink response to the first node, the transmitting of the uplink response being performed in an uplink frame of the TDMA super-frame structure, wherein the uplink frame comprises a field for uplink payload data and a field for time indicating data, wherein transmitting the uplink response includes transmitting time stamps in the time indicating data field, the time stamps indicating a time instance of the receiving of the downlink transmission and a time instance of the transmitting of the uplink response, wherein the time instances are determined using the clock of the second node.

2. The communication method of claim 1, wherein the uplink frame comprises a field for acknowledgements and wherein transmitting the uplink response includes transmitting an acknowledgement indicating the receiving of the downlink transmission.

3. The communication method of claim 1, wherein the received downlink transmission comprises synchronization data, the method further comprising:
  synchronizing the clock based on the synchronization data, wherein the synchronizing is performed between the receiving of the downlink transmission and the transmitting of the uplink response; and
  adjusting the time instances in accordance with the synchronization data.

4. The communication method of claim 1, comprising receiving a further downlink transmission that comprises synchronization data, and synchronizing the clock based on the synchronization data of the further downlink transmission.

5. A communication node comprising:
  a communication interface;
  a clock; and
  a register configured to register times of reception and transmission and for time stamping transmissions, the communication node being configured to perform the communication method of claim 1.

6. The communication node according to claim 5, further comprising a synchronizer configured to adjust the clock.

7. A communication method for wireless communication using a TDMA (Time Division Multiple Access) super-frame structure for scheduling uplink and downlink transmissions, the communication method being performed by a first communication node that comprises a clock, the communication method comprising:
  transmitting a downlink beacon to a plurality of communication nodes;
  registering a time instance of transmitting the downlink beacon;
  receiving an uplink response from a second node of the communication nodes, wherein the uplink response comprises time stamps indicating a time instance of reception of the downlink beacon at the second node, and a time instance of transmitting the uplink response by the second node;

registering a time instance of receiving the response;
calculating a clock offset between the first communication node and the second node;
calculating a propagation delay between the first communication node and the second node, wherein calculating the clock offset and the propagation delay is based on the registered time instances of the downlink transmission and uplink response and on the time stamps indicating time of reception of the downlink beacon and indicating the time of transmission of the response; and
transmitting a further downlink beacon and including indicating the calculated clock offset and the calculated propagation delay in a field for synchronization data provided in the downlink beacon.

8. A communication node configured to perform the communication method of claim 7 as the first communication node, the communication node comprising:
a communication interface for wireless communication with other communication nodes;
a time register configured to perform the registering steps;
a time offset calculator configured to perform the step of calculating the clock offset; and
a propagation delay calculator configured to perform the step of the propagation delay.

9. The communication node according to claim 8 further comprising acknowledging means for acknowledging received transmissions, the communication node being configured to include acknowledgements of received uplink frames in a field in the transmitted downlink beacon.

10. A communication method for wireless communication using TDMA for communication between a first node and a plurality of second nodes, the TDMA communication comprising using a super-frame structure for scheduling uplink data transmissions from the second nodes to the first node and scheduling downlink data transmissions from the first node to the second nodes, the method comprising:
transferring a downlink beacon from the first node to the second nodes;
transferring an uplink transmission as a response to the downlink transmission from one second node of the second nodes to the first node,
calculating a clock offset and a propagation delay between the first node and the one second node using a time instance of transmitting the downlink beacon by the first node, a time instance of receiving the downlink beacon by the one second node, a time instance of transmitting the response by the one second node and a time instance of receiving the response in the first node; and
synchronizing the first node and the second node, the synchronizing including transferring a subsequent downlink beacon including an indication of the clock offset and the propagation delay in a synchronization field of the subsequent downlink beacon.

11. The communication method according to claim 10, further comprising:
registering a time instance of transfer of a first frame by the first node as the time instance of transmitting the downlink beacon by the first node and a time instance of receiving the first frame by the one second node as the time instance of receiving the downlink beacon by the one second node; and
registering a time of transfer of a response frame, as the time instance of transmitting the response by the one second node and the time of receiving the response frame by the first node as the time instance of receiving the response by the first node, wherein the calculating of offset and delay are based on the registered time instances.

12. The communication method according to claim 10, wherein the response includes a first and a second time stamp in a time indicating field of the response, wherein the first time stamp indicates the time of reception of the downlink beacon and the second time stamp indicates the time of transmission of the response.

13. The communication method according to claim 10, wherein the response includes an acknowledgement of the reception of the downlink beacon in an acknowledgement field of the response.

14. A communication method comprising:
wirelessly communicating using TDMA (Time Division Multiple Access) between a first node and a plurality of second nodes using a TDMA super-frame structure for scheduling uplink data transmissions from the second nodes to the first node and scheduling downlink data transmissions from the first node to the second nodes;
wherein the TDMA super-frame structure comprises a first frame configured for a downlink beacon and a set of second frames, each second frame dedicated for uplink transmissions from a respective one of the plurality of second nodes; and
wherein each second frame comprises a field configured for transmitting time indicating data to the first node, or a fraction of the second frames comprises a field configured for transmitting time indicating data to the first node.

15. The communication method according to claim 14, wherein the communication method is performed by the first node such that wirelessly communicating between the first node and the plurality of second nodes comprises transmitting to the plurality of second nodes and receiving from the second nodes.

16. The communication method according to claim 14, wherein the communication method is performed by one of the second nodes so that wirelessly communicating between the first node and the plurality of second nodes comprises transmitting to the first node and receiving from the first node.

17. The communication method according to claim 14, wherein the time indicating data comprises a first and a second time stamp, where the first time stamp indicates reception of a downlink frame from the first node and the second time stamp indicates transmission of an uplink frame to the first node.

18. The communication method according to claim 14, wherein, for each respective second node, each second frame comprises a field configured to acknowledge of reception of downlink data from the first node.

19. The communication method according to claim 14, wherein, for ones of the second nodes, the second frames each comprise a field configured for transmitting time indicating data to the first node, and wherein the first frame comprises a field configured for transmitting synchronization data to the ones of the second nodes.

20. The communication method according to claim 19, wherein, for all of the second nodes, the second frames each comprise a field configured for transmitting time indicating data to the first node, and the first frame comprises a field configured for transmitting synchronization data to the second nodes.

21. The communication method according to claim 19, wherein the synchronization data of the field indicates a propagation delay and a clock offset.

22. The communication method according to claim 21, wherein the time indicating data comprises a first and a second time stamp, where the first time stamp indicates reception of a downlink frame from the first node and the second time stamp indicates transmission of an uplink frame to the first node; and wherein the first node and each second node comprises a respective clock, and the first node being configured to calculate the clock offset of a second node in question in accordance with the following equation:

$$\Delta = (T^3_0 - T^2_0 + T^3_1 - T^2_1)/2$$

where $\Delta$ is the clock offset of the second node in question;

$T^2_0$ is a time instance when the first node transmits the downlink frame, the time instance being determined by the first node;

$T^2_1$ is a time instance when the first node receives the uplink frame from the second node according to the clock of the first node;

$T^3_0$ is a time instance when the second node receives the downlink frame; and $T^3_1$ is a time instance when the second node transmits the uplink frame according to the clock of the second node, and as provided to the first node by means of the second time stamp.

23. The communication method according to claim 22, wherein the first node is configured to calculate the propagation delay in accordance with the following equation:

$$d = T^3_0 - T^2_0 - \Delta$$

where d is the propagation delay between the first node and the second node in question, and wherein $$\Delta = (T^3_0 - T^2_0 + T^3_1 - T^2_1)/2.$$

24. The communication method according to claim 14, wherein the first frame for each second node comprises a field configured to acknowledge of the reception of a second frame of a previous super-frame.

* * * * *